(12) United States Patent
Stefanovic et al.

(10) Patent No.: US 11,209,004 B2
(45) Date of Patent: Dec. 28, 2021

(54) THERMAL ARCHITECTURE OF AN AIR COMPRESSOR

(71) Applicant: SAFRAN ELECTRICAL & POWER, Blagnac (FR)

(72) Inventors: Nicolas Stefanovic, Moissy-Cramayel (FR); Michael Polin, Moissy-Cramayel (FR); Arnaud Genin, Moissy-Cramayel (FR)

(73) Assignee: Safran Electical & Power, Blagnac (FR)

( * ) Notice: Subject to any disclaimer, the term of this patent is extended or adjusted under 35 U.S.C. 154(b) by 0 days.

(21) Appl. No.: 17/054,821

(22) PCT Filed: May 28, 2019

(86) PCT No.: PCT/FR2019/051230
§ 371 (c)(1),
(2) Date: Nov. 12, 2020

(87) PCT Pub. No.: WO2019/229352
PCT Pub. Date: Dec. 5, 2019

(65) Prior Publication Data
US 2021/0239124 A1 Aug. 5, 2021

(30) Foreign Application Priority Data
May 31, 2018 (FR) ...................................... 1854715

(51) Int. Cl.
*F04D 17/10* (2006.01)
*F02C 6/12* (2006.01)
(Continued)

(52) U.S. Cl.
CPC ............ *F04D 17/10* (2013.01); *F02B 19/165* (2013.01); *F02C 6/12* (2013.01); *F02C 7/24* (2013.01);
(Continued)

(58) Field of Classification Search
CPC .... F04D 17/10; F04D 29/023; F04D 29/4206; F04D 29/4213; F02C 6/12; F02C 7/24; F05D 2300/121; F05D 2300/436
See application file for complete search history.

(56) References Cited

U.S. PATENT DOCUMENTS 5,350,039 A * 9/1994 Voss ........................ F04D 25/06
184/104.1
7,633,193 B2 * 12/2009 Masoudipour ...... F04D 29/5806
310/54

(Continued)

FOREIGN PATENT DOCUMENTS

DE 102007017827 A1 10/2008
DE 102014002439 B3 7/2015

(Continued)

OTHER PUBLICATIONS

Search Report dated Feb. 13, 2019, in FR Application No. 1854715 (2 pages).

(Continued)

*Primary Examiner* — Woody A Lee, Jr.
*Assistant Examiner* — Brian Christopher Delrue
(74) *Attorney, Agent, or Firm* — Bookoff McAndrews, PLLC

(57) ABSTRACT

Air compressor comprising a centrifugal-type compression wheel defining an axial direction and a radial direction, an air intake opening extending circumferentially around the compression wheel and opening onto a compression part, the compression part comprising a first portion forming a volute for the ejection of compressed air which is mounted facing the compression wheel in the radial direction, and an at least partly annular second portion extending around the first portion, the second portion comprising a central orifice receiving at least part of the compression wheel and an air deflection torus, the volute being made of metallic material (Continued)

and the torus made of thermoplastic material filled with non-metallic elements, the thermoplastic material having a thermal expansion corresponding to that of the metallic material.

6 Claims, 4 Drawing Sheets

(51) Int. Cl.
*F02C 7/24* (2006.01)
*F04D 29/02* (2006.01)
*F04D 29/42* (2006.01)
*F02B 19/16* (2006.01)

(52) U.S. Cl.
CPC ....... *F04D 29/023* (2013.01); *F04D 29/4206* (2013.01)

(56) References Cited

U.S. PATENT DOCUMENTS

| | | | |
|---|---|---|---|
| 2015/0322850 A1* | 11/2015 | Vardhana | F01D 15/02 415/177 |
| 2017/0175748 A1* | 6/2017 | Pal | F04D 29/584 |
| 2019/0072029 A1* | 3/2019 | Halldorf | F02B 39/16 |
| 2020/0166051 A1* | 5/2020 | Kanzaka | F04D 29/5853 |
| 2020/0400027 A1* | 12/2020 | Okabe | F01D 5/3092 |

FOREIGN PATENT DOCUMENTS

| | | |
|---|---|---|
| FR | 3045111 A1 | 6/2017 |
| WO | WO 2017141312 A1 | 8/2017 |

OTHER PUBLICATIONS

International Search Report issued in International Application No. PCT/FR2019/051230 dated Aug. 20, 2019 (2 pages).

\* cited by examiner

THERMAL ARCHITECTURE OF AN AIR COMPRESSOR

CROSS-REFERENCE TO RELATED APPLICATION(S)

This application is the U.S. national phase entry under 35 U.S.C. § 371 of International Application No. PCT/FR2019/051230, filed on May 28, 2019, which claims priority to French Patent Application No. 1854715, filed on May 31, 2018.

BACKGROUND OF THE INVENTION

The invention relates to an air compressor that can be integrated into an aircraft, in particular into the turbomachine thereof. More specifically, the invention relates to a thermal architecture of an air compressor. Such an air compressor can in particular be intended for a fuel cell system with a view to supplying air to said fuel cell.

The thermal aspects constitute a particularly important issue for air compressors. For example, for a centrifugal air compressor with an air compression ratio of 2.3, a rise in the temperature of the compressed air comprised between 130° C. and 140° C. is typically observed. The temperature of the compressed air can then by thermal conduction propagate along the body of the air compressor and induce a rise in temperature of the latter.

The air compressors are also commonly associated with electronic components configured to ensure their power supply as well as their command. Given the fragility of these electronic components, the temperature of the air compressors should be limited, as a too high temperature may result in damage to the electronic components. As such, limiting the temperature of the air compressors then implies limiting their compression ratios.

In order to overcome this problem and to allow higher compression ratios, a known solution consists in placing on the body of an air compressor a thermal barrier, typically made of Titanium or Stainless Steel, which may be in the form of a flat seal. Such a solution has the advantage of reducing the thermal conduction of the body of the compressor, and therefore allows the implementation of higher air compression ratios. However, the addition of a thermal barrier strongly impacts the mass as well as the volume of the air compressor. Another known solution consists in using a cooling system associated with the body of the air compressor. However, such a solution once again strongly impacts the mass and volume of the air compressor.

As such, the existing solutions proved to be limited and there remains a need to achieve high air compression ratios while limiting the mass and volume of the air compressors.

OBJECT AND SUMMARY OF THE INVENTION

The present invention aims at overcoming the aforementioned drawbacks.

To this end, the invention proposes an air compressor comprising:
- a centrifugal-type compression wheel defining an axial direction and a radial direction,
- an air intake opening extending circumferentially around the compression wheel and opening onto a compression part,
- the compression part comprising a first portion forming a volute for the ejection of compressed air which is mounted facing the compression wheel in the radial direction, and a second portion comprising an annular section extending around the first portion, the annular section extending radially inwardly and outwardly from the volute, the second portion further comprising a torus delimiting a central orifice receiving at least part of the compression wheel, the volute being made of metallic material and the annular section of the second portion made of thermoplastic material filled with non-metallic elements, and the thermoplastic material having a thermal expansion corresponding to that of the metallic material.

Advantageously, the production in the air compressor of a compression part formed in two portions allows limiting the heating of said compressor. The compressed air ejection volute is made of metallic material, and thus has thermal expansion close to that of the compression wheel. In the event of thermal expansion of the compression wheel resulting from the heating of the compressed air, the volute expands as well thus limiting any risk of friction with the compression wheel. The thermoplastic material of the torus for its part allows limiting the thermal conductivity of the body of the air compressor. It is thus possible to implement high air compression ratios, while eliminating a risk of heating of the air compressor which could result in damage to its control and power electronics. Moreover, the use of a thermoplastic material implies a particularly low density compared to existing insulation or cooling solutions. Thus, the implementation of a torus made of thermoplastic material also allows minimizing the mass of the air compressor. The filler of the thermoplastic material by non-metallic elements also allows maintaining a low density while providing the torus thermal expansion properties corresponding to those of the mechanical volute. Thus, the material chosen for the torus allows monitoring any possible thermal expansion of the volute so as to prevent any risk of mechanical detachment between these parts.

In an exemplary embodiment, the air compressor further comprises a first revolution casing extending between the air intake opening and the compression part, at least one air conveying channel allowing air to circulate in the axial direction from the air intake opening, and passages communicating with said at least one air conveying channel configured to allow air to circulate in the axial direction of the conveying channel towards the torus.

In one exemplary embodiment of the air compressor, the volute is made of Aluminum.

In one exemplary embodiment of the air compressor, the torus is made of carbon-filled polyetheretherketone. The use of such a material has the advantage of including a thermal conductivity about a thousand times lower than that of Stainless Steel or Titanium materials which are commonly used as insulators. Polyetheretherketone also has a significantly lower density than Aluminum, Titanium or Stainless Steel. The implementation of a polyetheretherketone torus therefore allows significantly reducing the mass of the air compressor.

In one exemplary embodiment of the air compressor, the torus is an injection-molded part on the volute.

The invention also proposes, according to another aspect, an aircraft comprising the air compressor summarized above.

BRIEF DESCRIPTION OF THE DRAWINGS

Other characteristics and advantages of the invention will emerge from the following description of particular embodiments of the invention, given by way of non-limiting examples, with reference to the appended drawings, in which.

DETAILED DESCRIPTION OF EMBODIMENTS

Figure 1:
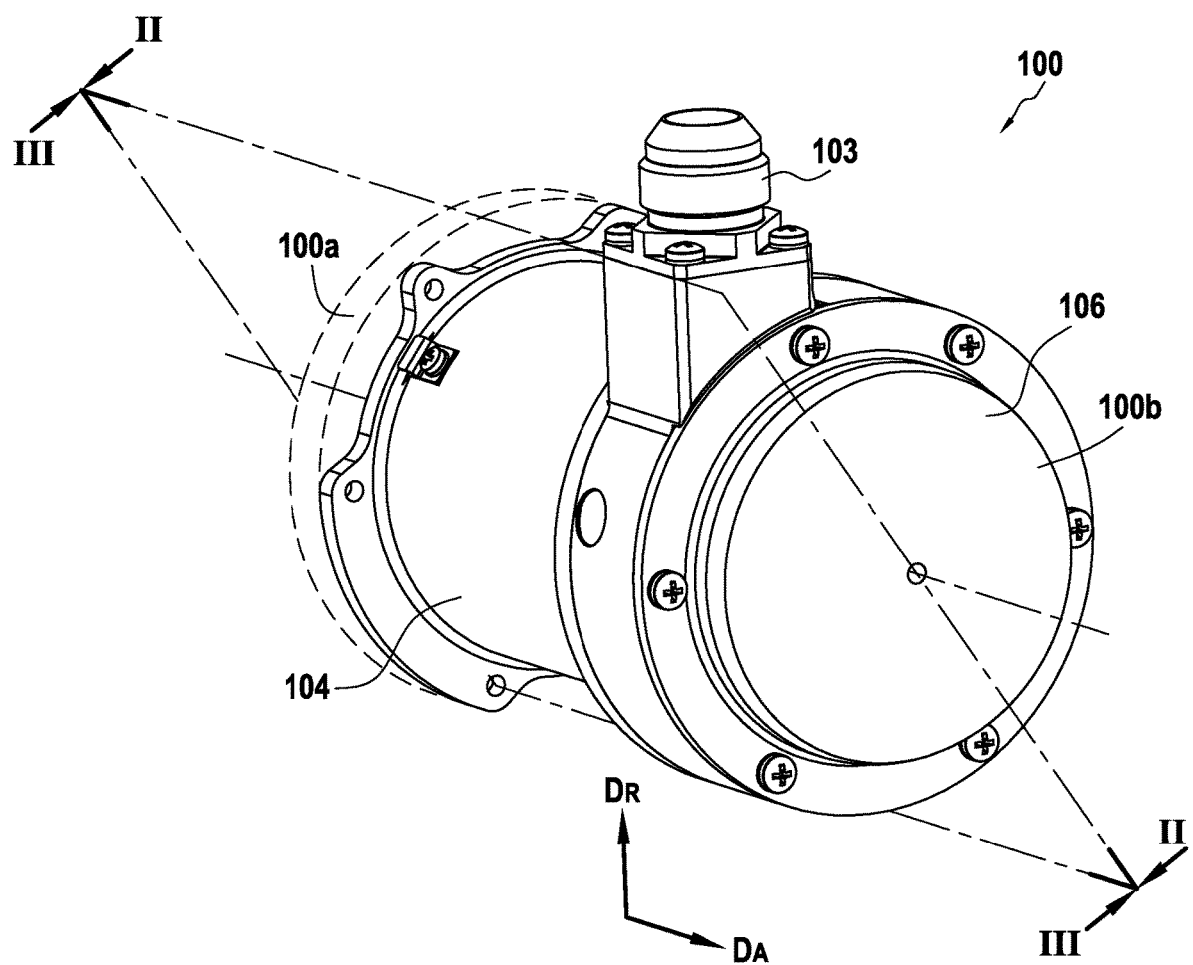
FIG. 1 is a perspective view of an air compressor according to a first embodiment.
Figure 2:
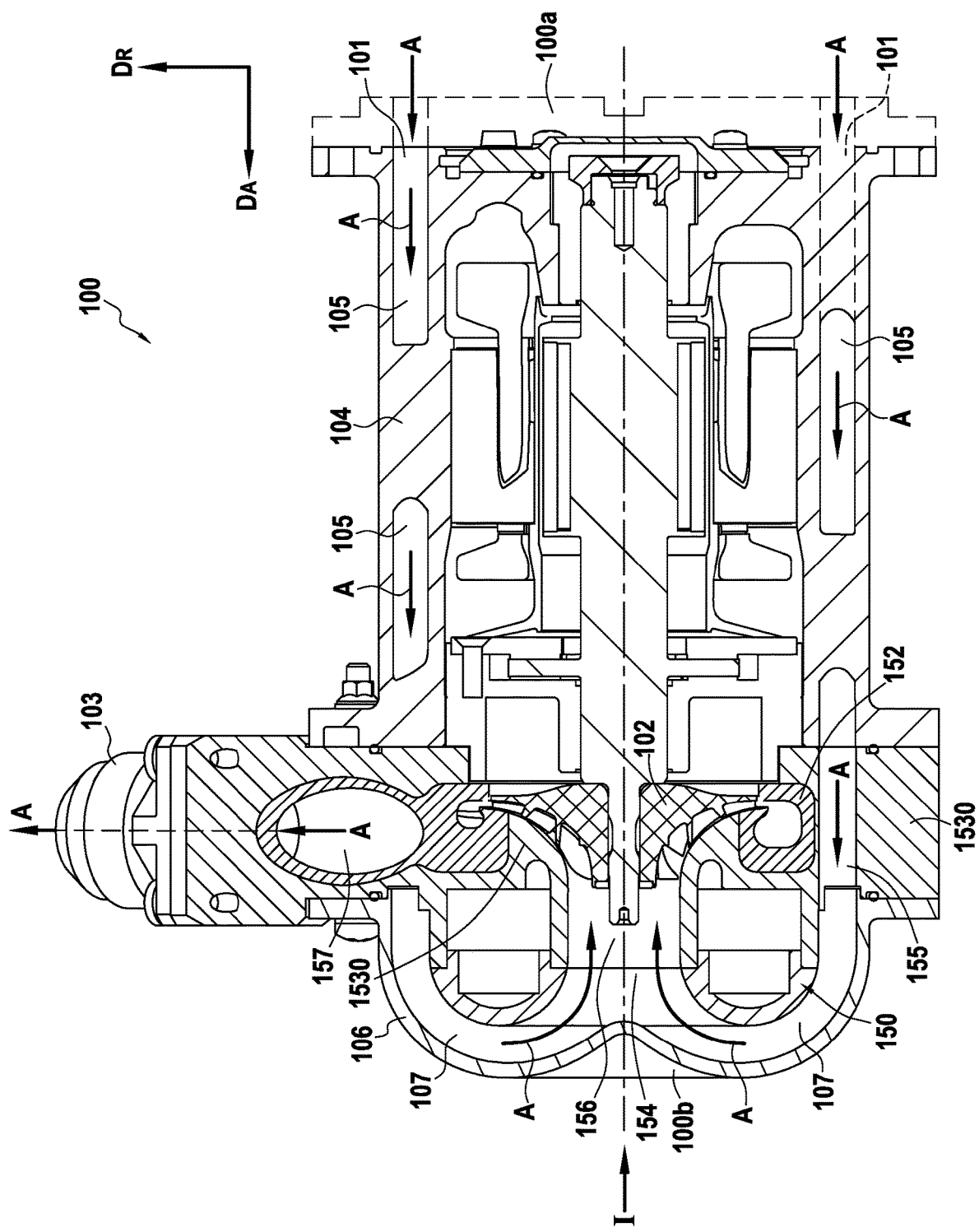
FIG. 2 is a sectional view along the cutting plane II-II of the air compressor of FIG. 1 according to a first embodiment.

FIG. 1 illustrates a perspective view of a centrifugal-type air compressor 100. FIG. 2 corresponds to a sectional view along the plane II-II of this air compressor 100, and the arrow I indicated in this figure refers to the orientation of the perspective view of FIG. 1. The air compressor 100 may optionally, but not necessarily, be integrated into an aircraft, in particular into the turbomachine thereof.

The air compressor 100 comprises an air intake opening 101, in which an air flow A is conveyed through not illustrated means. The direction of circulation of the air flow A in the compressor is symbolized by unidirectional arrows in FIGS. 2 and 3.

In known manner, the air compressor 100 compresses, using a compression wheel 102, the received air flow A, then expels it via an air outlet 103. Such an air compressor 100 can in particular be used in a fuel cell system with a view to supplying air to said cell.

The compression wheel 102 is of the centrifugal-type and defines an axial direction DA and a radial direction DR. The air compressor 100 extends axially along the axis DA between a first end 100a and a second end 100b located opposite the first end 100a. The air intake opening 101 is located at the first end 100a and extends circumferentially around the compression wheel 102.

Figure 3:
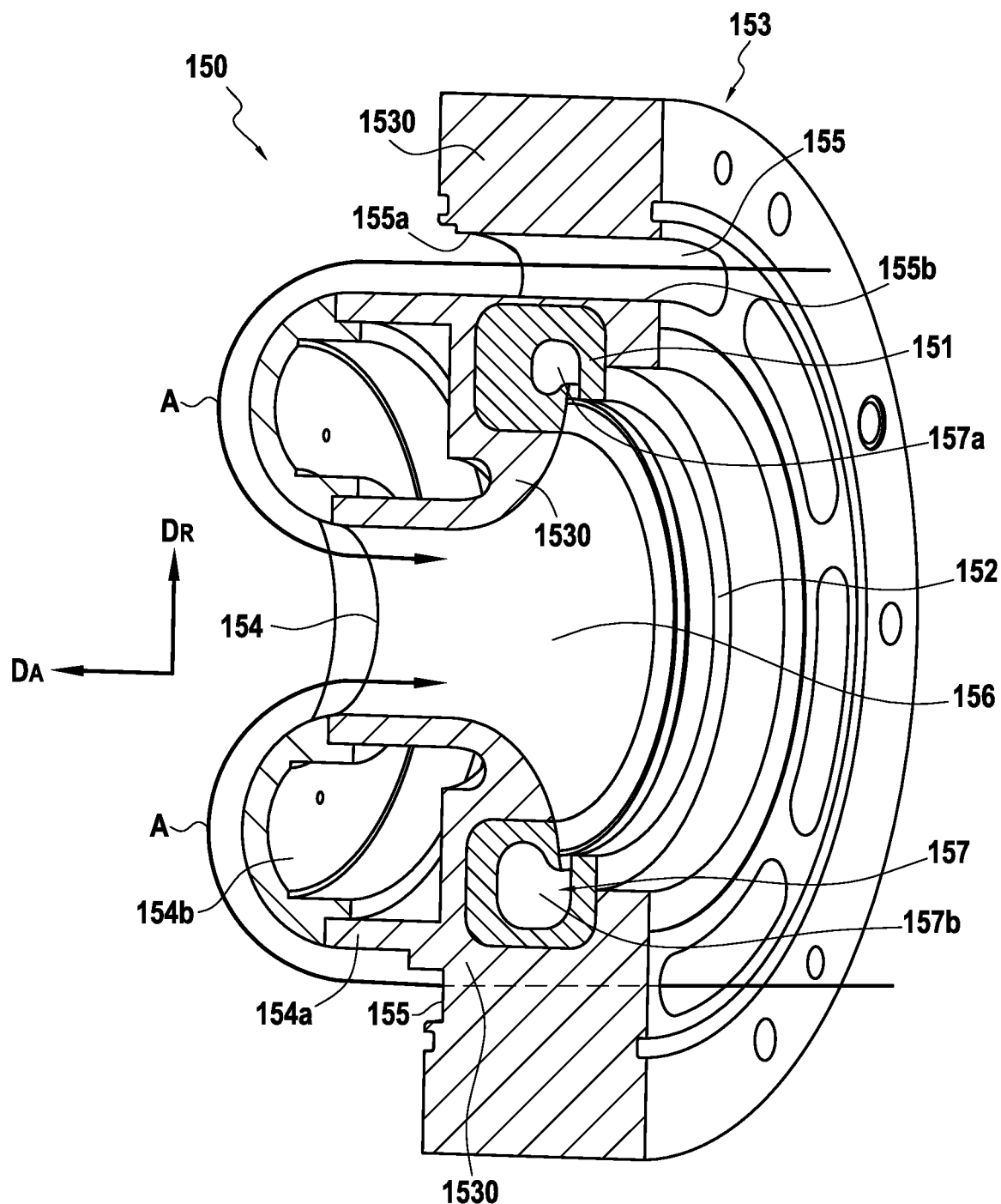
FIG. 3 is a sectional view along the cutting plane III-III of a compression part constituting the air compressor of FIG. 1.

A first casing 104 extends axially between the air intake opening 101 and a compression part 150. FIG. 3 illustrates a sectional view of the compression part 150 along the cutting plane III-III illustrated in FIG. 1.

The first casing 104 further comprises at least one air conveying channel 105 allowing air A to circulate in the axial direction DA from the air intake opening 101.

The compression part 150 comprises a first portion 151 forming a volute 152 for the ejection of compressed air which is mounted facing the compression wheel 102 along the radial direction DR. The compression part 150 further comprises an at least partly annular second portion 153 extending around the first portion. More specifically, as represented in FIG. 3, the second portion 153 comprises an annular section 1530 which extends radially inwardly and outwardly from the volute 152.

The second portion 153 further comprises an air deflection torus 154 extending the annular section 1530 along the axial direction DA and passages 155 defining air ducts. The torus 154 delimits a central orifice 156 receiving at least part of the compression wheel 102. The passages 155 arranged in the second portion 153 communicate with said at least one air conveying channel 105 so as to allow the circulation of the air A from the air conveying channel 105 to the torus 154 along the axial direction DA.

Thus, the passages 155 each define along the radial direction DR an outer wall 155a and an inner wall 155b. The torus 154 then extends along the axial direction DA in the extension of each inner wall 155b so as to deflect the air A derived from the passages 155 towards the central orifice 156 of the compression part 150. The air compressor 100 further comprises a second circular casing 106 mounted on the compression part 150. The second casing 106 extends along the axial direction DA in the extension of the outer wall 155a of each passage 155 and is spaced from the torus 154. Thus, the second casing 106 cooperates with the passages 155 and the torus 154 so as to form air circulation channels 107 making it possible to deflect the air A derived from the passages towards the central orifice 156 of the compression part 150.

A hollow groove 157 is arranged in the volute 152. A first end 157a of this groove 157 opens out towards the central orifice 156 of the compression part 150 and a second end 157b is connected to the air outlet 103 of the air compressor 100. The diameter of the groove 157 increases continuously between the first and second ends 157a, 157b. Thus, in a known manner, the operation of the air compressor 100 is as follows. Air A is conveyed towards the air intake 101 of the compressor, flows successively in said at least one air conveying channel 105, in the passages 155, then in the channels 107 so as to be deflected towards the central orifice 156 of the compression part 150. The rotation of the compression wheel 102 accelerates and then deflects the air A, which has been conveyed in the central orifice 156 of the compression part 150, towards the first end 157a of the groove 157 of the volute 152. The air A circulating through the groove 157 of the volute 152 is then compressed and then expelled through the air outlet 103.

According to the invention, with a view to limiting any heating of the air compressor 100 related to the temperature of the expelled air A, the volute 152 on the one hand and the annular section 1530 and the torus 154 on the other hand are made of distinct materials.

The volute 152 is made of a metallic material. The volute 152 being facing the compression wheel 102, the metallic material constituting the volute 152 is chosen so as to have thermal expansion characteristics close to or corresponding to those of the compression wheel 102. Thus, in the event of thermal expansion of the compression wheel 102 related to heating of the compressed air, the volute 152 also expands closely or similarly. Any risk of friction between the volute 152 and the compression wheel 102 is thus eliminated.

The volute 152 can, for example, be made of Aluminum. This metal has indeed good thermal expansion characteristics and good mechanical strength which can contain any debris, in an unlikely situation of a bursting of the compression wheel 102.

The annular section and the torus 154 are made of thermoplastic material filled with non-metallic elements. The use of a thermoplastic material indeed includes the advantage of having a low thermal conductivity, thus making it possible to limit the heating of the body of the air compressor 100 by the compressed air it expels. It is thus possible to implement high air compression ratios, while limiting the risks of heating of the air compressor 100. The risks of thermal impacts likely to result in damage to the power or control electronics of the air compressor 100 are therefore also eliminated. The annular section and the torus 154 are for example manufactured from polyetheretherketone, this material being commonly referred to by the acronym PEEK (PolyEtherEtherKetone).

A table comparing the thermal conductivity and the density of a PEEK material with respect to Stainless Steel, Titanium and Aluminum materials is given above:

| | | |
|---|---|---|
| Thermal Conductivity | Aluminum | 237 W·m⁻¹·K⁻¹ |
| | Stainless Steel | 26 W·m⁻¹·K⁻¹ |
| | Titanium | 20 W·m⁻¹·K⁻¹ |
| | PEEK | 0.25 W·m⁻¹·K⁻¹ |
| Density | Stainless Steel | 7,500 Kg·m⁻¹ |
| | Titanium | 4,500 Kg·m⁻¹ |
| | Aluminum | 2,700 Kg·m⁻¹ |
| | PEEK | 1,300 Kg·m⁻¹ |

It is observed here that the use of a PEEK material for the manufacture of the annular section 1530 and of the torus 154 allows significantly reducing the thermal conductivity of the compressor, the PEEK material having, for example, a thermal conductivity about a thousand times lower than that of Aluminum. The mass of the air compressor 100 is also reduced, the PEEK material having, for example, a thermal conductivity about twice lower than that of Aluminum.

Furthermore, the annular section 1530 being disposed around the volute 152 in order to form the compression part 150, the latter must be capable of monitoring any possible thermal expansion of the volute 152. To do so, the thermoplastic material is filled with non-metallic elements, so that the thermoplastic material has a thermal expansion corresponding to that of the metallic material of the volute 152. In other words, the thermoplastic material of the annular section 530 and of the torus 154 and the metallic material of the volute 152 have thermal expansion coefficients chosen so as to allow mechanical clamping between these two materials (depending on the admissible mechanical stresses) and over a predetermined temperature range.

Thus, the material constituting the annular section and the torus 154 allows monitoring any possible thermal expansion of the volute 152, limiting any risk of mechanical detachment between these parts. For example, carbon can be used as a non-metallic filler. Thus, in connection with the previous example, the thermoplastic material constituting the annular section 1530 and the torus 154 can be a carbon-filled PEEK material. In the example of an Aluminum volute 152, it is thus possible to produce a PEEK torus having an expansion coefficient equal (or close, on the order of more or less $10^{-6}$) to Aluminum by adjusting the carbon filler percentage in this material.

For the purpose of mechanical accuracies, the volute 152 can, for example, be manufactured from a lost wax casting. In order to obtain the compression part 150, the annular section 1530 and the torus 154 may optionally, but not necessarily, be injection-molded on the volute 152 after manufacture thereof. On the other hand, in order to further decrease the mass of the air compressor 100, the torus 154 can be manufactured in the form of a hollow volume. Thus, in FIG. 3, the torus 154 is obtained by assembling two hollow portions 154a, 154b.

Figure 4:
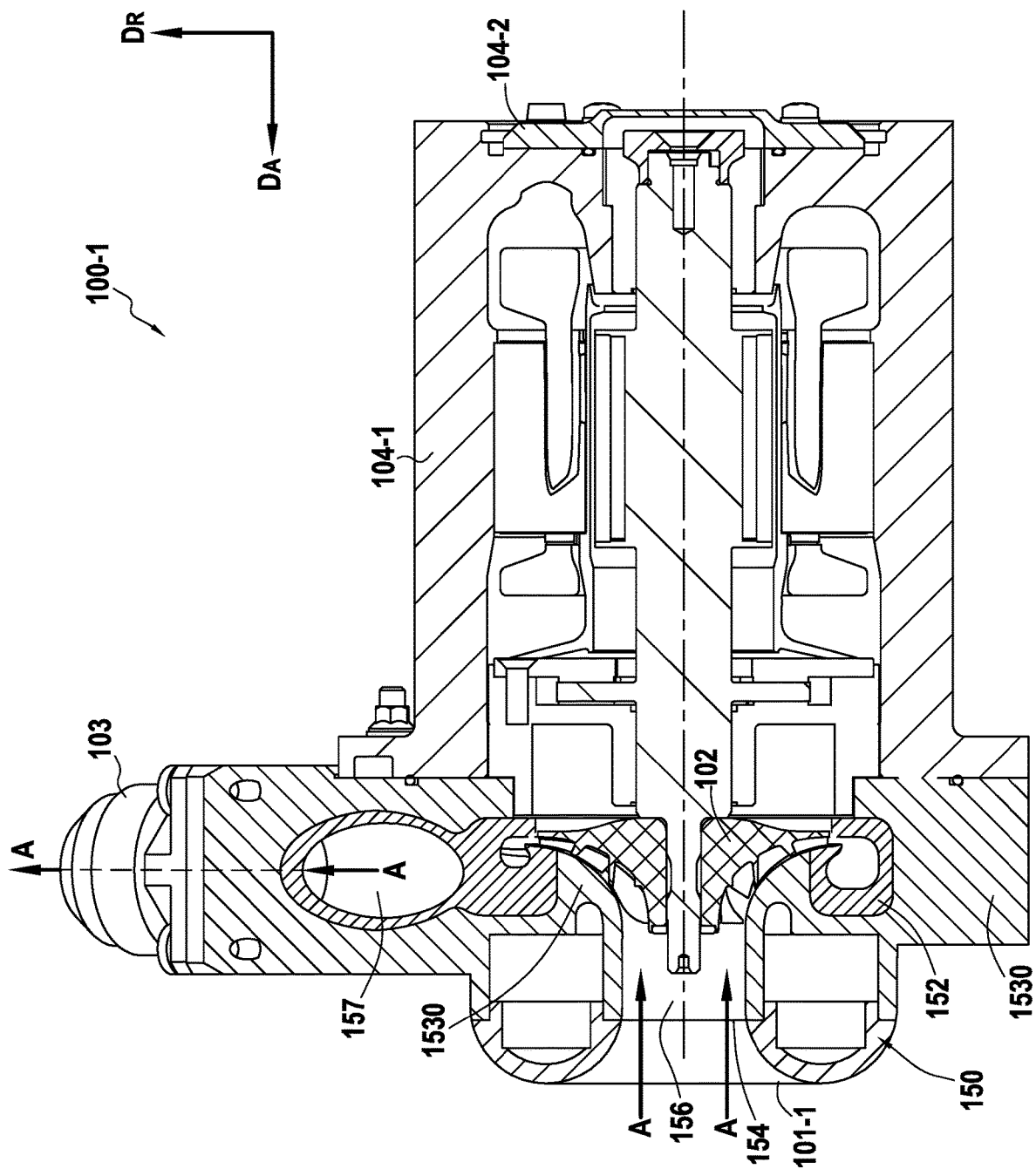
FIG. 4 is a sectional view of an air compressor according to a second embodiment, including the same compression part as that of FIG. 3.

A particular architecture of air compressor 100 has been described here. However, it is understood that the embodiments of the compression part 150, of the volute 152, of the annular section 1530 and of the torus 154 can be applied to any other air compressor architecture. By way of example, FIG. 4 represents an air compressor 100-1 to which the previous embodiments apply. The unchanged reference numerals here correspond to the previously described parts. In the architecture of this air compressor 100-1, the air intake opening 101-1 extends circumferentially around the compression wheel 102, but unlike the air compressor 100, opens out directly onto the compression part 150. The air compressor 100-1 also comprises a casing 104-1 comprising a solid bottom 104-2. The casing 104-1 here includes neither an air intake opening, nor air conveying channels. The air flow A, whose direction of circulation is symbolized by unidirectional arrows, is therefore here conveyed directly towards the central orifice 156 of the compression part 150. Once again, the rotation of the compression wheel 102 accelerates and deflects the air A towards the first end 157a of the groove 157 of the volute 152. The air A circulating through the groove 157 of the volute 152 is then compressed and then expelled through the air outlet 103. The volute 152 and the torus 154 of the compression part can be produced as described above.

Advantageously, the embodiments described above allow reducing the thermal impact of the compressed air A at the outlet of the air compressor 100, while reducing the mass thereof. Experimental studies thus allowed reducing the mass of the air compressor 100, 100-1 by about 5% compared to existing air compressors, while enhancing its resistance to possible heating.

The invention claimed is:

1. An air compressor comprising:
a centrifugal-type compression wheel defining an axial direction and a radial direction,
an air intake opening extending circumferentially around the compression wheel and opening onto a compression part,
the compression part comprising a first portion forming a volute for the ejection of compressed air which is mounted facing the compression wheel in the radial direction, and a second portion comprising an annular section extending around the first portion, the annular section extending radially inwardly and outwardly from the volute, the second portion further comprising a torus delimiting a central orifice receiving at least part of the compression wheel,
the air compressor being characterized in that the volute is made of metallic material and the annular section of the second portion is made of thermoplastic material filled with non-metallic elements, and in that the thermoplastic material with non-metallic elements has a thermal expansion corresponding to that of the metallic material so as to allow mechanical clamping of the metallic material and the thermoplastic material with non-metallic elements.

2. The air compressor according to claim 1, further comprising a first revolution casing extending between the air intake opening and the compression part, at least one air conveying channel allowing air to circulate in the axial direction from the air intake opening, and passages communicating with said at least one air conveying channel configured to allow air to circulate in the axial direction of the conveying channel towards the torus.

3. The air compressor according to claim 1, wherein the volute is made of Aluminum.

4. The air compressor according to claim 1, wherein the torus is made of carbon-filled polyetheretherketone.

5. The air compressor according to claim 1, wherein the torus is an injection-molded part on the volute.

6. An aircraft comprising an air compressor according to claim 1.

* * * * *